W. R. BRESEE.
QUICK ACTING WRENCH.
APPLICATION FILED FEB. 20, 1909.
957,932.
Patented May 17, 1910.
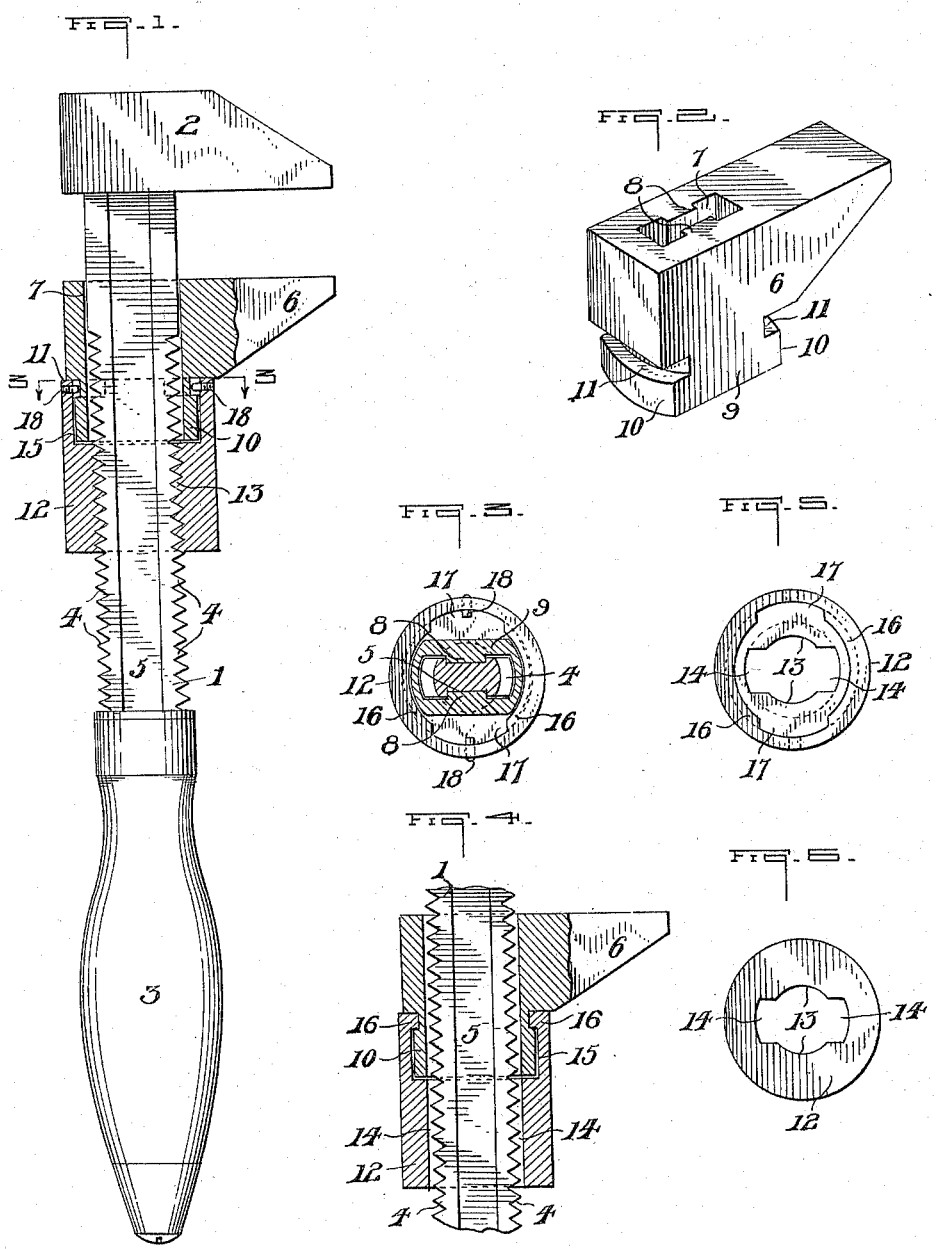
WITNESSES:
INVENTOR
William R. Bresee,
by Edward A. Lawrence,
his ATTORNEY

UNITED STATES PATENT OFFICE.

WILLIAM R. BRESEE, OF BELLEVUE BOROUGH, PENNSYLVANIA.

QUICK-ACTING WRENCH.

957,932.      Specification of Letters Patent.      Patented May 17, 1910.

Application filed February 20, 1909. Serial No. 479,078.

*To all whom it may concern:*

Be it known that I, WILLIAM R. BRESEE, a citizen of the United States, and residing in the borough of Bellevue, in the county of Allegheny and State of Pennsylvania, have invented or discovered new and useful Improvements in Quick-Acting Wrenches, of which the following is a specification.

My invention consists in a new and improved quick acting wrench which is as strong and durable, and obtains as good an engagement as the ordinary screw nut monkey wrench, while, at the same time, it can be quickly applied to a nut, bolt or other object and as quickly released. It contains no springs or other fragile parts but is simple and substantial in construction.

In general, it consists of the following elements. A fixed jaw rigidly mounted on the extremity of a shank which is provided on its edges with interrupted spiral threads extending to a short distance from the fixed jaw. The faces of the shank are provided with longitudinal guide grooves. The movable jaw is provided with an aperture in its head by means of which it is mounted to slide on the shank and the side walls of said aperture are provided with projections which engage said guide grooves in the shank. A collar is also mounted on the shank and provided with interrupted spiral threads which engage the threads on the shank when the collar is turned in certain positions, and also provided with cutaway portions, which, when opposing the threaded edges of the shank permit the collar to slide freely on said shank. In the upper portion of the collar is provided an annular seat for the neck of the movable jaw in which said neck is secured by means of lips on the collar which, when said collar is in its slidable position, engage grooves in said neck. Between said lips are cutaway portions by means of which said neck is introduced into said seat. Removable means are provided to prevent the accidental separation of the neck from the collar.

In the accompanying drawings, Figure 1 is a side elevation of the wrench, the movable jaw and collar being shown in section and the collar being in threaded engagement with the shank; Fig. 2 is a perspective of the movable jaw; Fig. 3 is a vertical section along the line 3—3 in Fig. 1; Fig. 4 is a broken view in section of a portion of the structure shown in Fig. 1, the collar being turned into its slidable position; Fig. 5 is a top plan view of the collar, and Fig. 6 is a bottom plan view of the same.

The following is a detailed description of the drawings.

1 is the shank and 2 the fixed jaw mounted on the end thereof. 3 is the handle removably attached to the other end of the shank. The edges of the shank up to a short distance from the fixed jaw are provided with interrupted spiral threads 4—4.

5—5 are longitudinal, guide depressions on the faces of the shank 1.

6 is the movable jaw, provided with a vertical opening 7 adapted to fit over and slide along the shank 1 and provided with guide projections 8—8 which engage the depressions 5—5 to enable the jaw to move along said shank without binding or lagging on the threads 4—4. The neck 9 of the movable jaw is of less width than the upper portion thereof and the faces of the segmental portions 10—10 are concentrically curved and provided at the top with concentrically curved or arc-shaped grooves 11—11.

12 is an annular collar adapted to be mounted on shank 1 and having the lower portion of its bore provided with spiral threads 13—13, interrupted in two opposing zones, as at 14—14, for a space sufficient to accommodate the threaded edges of the shank when the same are out of engagement with the threads 13—13 of the collar 12. It is evident that when said collar is turned so that the threads 4—4 of the shank register with the cutaway portions 14—14 of the collar, the collar may be slid freely along the shank, but when the threads 13—13 of the collar register with the threads 4—4 of the shank, the collar can only be advanced along the shank by being rotated.

15 is a socket in the upper part of collar 12 in which may be seated the neck 9 of the movable jaw 6 and, when seated, the curved faces of the segmental portions 10—10 on the neck 9 bear against the inner wall of the said collar 12 and the top of the collar bears against the movable jaw.

16—16 are two segmental lips, on the top of collar 12, adapted to engage and lie snugly within the grooves 11—11 in the neck 9 of the movable jaw, thus holding said movable jaw in connection with said collar.

The segmental portions 10—10 extend the entire depth of the socket 15 (as shown in the drawing), thus snugly fitting within the latter and preventing any lost motion and, in connection with the lips 16—16 fitting snugly within the grooves 11—11, afford a firm and stable structure.

Between the abutting ends of lips 16—16 are cutaway portions 17—17, of a sufficient width to permit the insertion of the neck 9 into the seat 15, the cutaway portions 17—17 being placed at right angles to the cutaway portions 14—14 in the lower, partially threaded, portion of collar 12. It is evident that when the collar 12 is turned to slide on shank 1, the lips 16—16 are engaged in grooves 11—11 in the neck 9, so that when the collar and its attached jaw are slid along the shank 1, there is a positive engagement between collar and jaw. It is also evident that when the collar 12 is turned into threaded engagement with the threads 4—4 on the shank, the grooves 11—11 will register with the cutaway portions 17—17 between the lips 16—16, so that some means must be provided for retaining the neck 9 in said seat 15 against accidental separation. For this purpose I provide pins or small screws 18—18 which extend through the wall of cutaway portions 17—17 to engage the grooves 11—11 when the collar is in the last named position. However, as the collar 12 is only turned into threaded engagement with the shank 1 when the movable jaw is being tightened against the object to be grasped by the wrench, all the pressure exerted by the collar on the jaw is exerted by the top edge of the collar directly on the movable jaw, so that no strain is exerted on pins 18—18.

The operation of my wrench is as follows:—The fixed jaw is placed against the nut or other object to be grasped in the usual manner and the collar 12 is turned so that cutaway portions 14—14 register with the threaded edges 4—4 on the shank so that the collar and the movable jaw may be slid up against the nut as snugly as possible. The collar 12 is now turned so that its threads 13—13 register with the threads 4—4 on the shank and the collar screwed up slightly on said threads 4—4, thus, by means of the pitch of the threads, forcing the movable jaw into firm engagement with the nut.

To release the wrench, the collar 12 is turned in a reverse direction until its cutaway portions, 14—14, register with the threaded edges of the shank, when the collar and movable jaw may be slid out of engagement with the nut. It is thus seen that while my wrench is of very quick action, at the same time I obtain the firm engagement with the nut which can only be obtained by screw action, the adjustment being accomplished by sliding action and the final tightening being accomplished by screw action.

The connection between the collar and movable jaw is novel and both simple and substantial, and may readily be assembled and disassembled, when desired.

What I desire to claim is:—

1. In a quick acting wrench, the combination of a shank upon the end of which is a fixed jaw and whose edges are provided with interrupted threads, a sliding jaw mounted on said shank and having a neck provided with a pair of arc shaped grooves, a collar mounted on said shank provided with two series of interrupted threads separated by cutaway portions so that when turned in one position said collar is in threaded engagement with said shank and when turned in another position said collar slides freely on said shank, said collar being provided with a seat in which said neck is contained, and segmental lips on said collar in line with said cutaway portions of said collar adapted to engage said arc shaped grooves, substantially as and for the purpose described.

2. In a quick acting wrench, the combination of shank 1 provided with fixed jaw 2, and interrupted threads 4; sliding jaw 6 provided with neck 10 and segmental grooves 11; collar 12 having interrupted threads 13, cutaway portions 14, neck seat 15 and segmental lips 16 in line with cutaway portions 14 adapted to engage said grooves 11, substantially as and for the purpose described.

Signed at Pittsburg, Penna., this 19th day of February, 1909.

WILLIAM R. BRESEE.

Witnesses:
E. A. LAWRENCE,
J. H. HARRISON.